United States Patent [19]

Robertson et al.

[11] 3,989,873

[45] Nov. 2, 1976

[54] FLUOROPOLYMER PRIMER COMPOSITIONS

[75] Inventors: Arthur B. Robertson, Succasunna; Robert J. Schaffhauser, Brookside; Elmer C. Lupton, Chatham; William A. Miller, Somerville, all of N.J.

[73] Assignee: Allied Chemical Corporation, Morris Township, N.J.

[22] Filed: Mar. 27, 1975

[21] Appl. No.: 563,012

[52] U.S. Cl. .............................. 428/422; 260/42.27; 428/463; 526/249; 526/250
[51] Int. Cl.² .................... B32B 27/32; B32B 27/30
[58] Field of Search ........... 428/285, 421, 422, 457, 428/463; 260/80.77, 87.5 B, 42.27

[56] References Cited
UNITED STATES PATENTS

| | | | |
|---|---|---|---|
| 2,961,341 | 11/1960 | Long | 428/422 |
| 2,979,418 | 4/1961 | Dipner | 428/421 X |
| 3,655,426 | 4/1972 | Fuchs | 428/421 |
| 3,847,881 | 11/1974 | Mueller et al. | 260/80.77 |
| 3,906,060 | 9/1975 | Mattiussi et al. | 260/42.27 X |
| 3,917,895 | 11/1975 | Bosniack | 428/421 |
| 3,933,773 | 1/1976 | Foerster | 260/42.27 |
| 3,936,569 | 2/1976 | Miller et al. | 428/421 X |
| 3,946,136 | 3/1976 | Fitz et al. | 428/421 X |

*Primary Examiner*—Harold Ansher
*Attorney, Agent, or Firm*—Roger H. Criss; Michael S. Jarosz

[57] ABSTRACT

This invention relates to a composition comprising a copolymer of ethylene and a halogenated comonomer selected from the group consisting of tetrafluoroethylene, chlorotrifluoroethylene and mixtures thereof and 0 to 10 mol percent of an additional monomer selected from the group consisting of 3,3,3-trifluoro-2-trifluoromethyl propene, a vinyl monomer which is free of telogenic activity and which provides a side chain having at least two carbon atoms, said side chain being aromatic or having its elements bonded together by a single bond only, or mixtures thereof, and containing from about 1 to about 40% by weight of an oxide of cobalt, nickel, manganese, chromium, tin, molybdenum, tungsten or mixtures thereof. Such compositions are particularly useful as a primer coating for substrates such as metals in conjunction with an overlying layer of such copolymers. Coated articles are provided which comprise a substrate, a primer coating fused thereon and comprising such composition and an outer coating of similar copolymers fused to the primer coating.

16 Claims, No Drawings

FLUOROPOLYMER PRIMER COMPOSITIONS

BACKGROUND OF THE INVENTION

1. Field of the Invention

This invention relates to fluoropolymer primer compositions useful for coating substrates, particularly copolymers based on ethylene and a comonomer selected from the group consisting of chlorotrifluoroethylene, tetrafluoroethylene and mixtures thereof.

2. DESCRIPTION OF THE PRIOR ART

Copolymers of about 40 to about 60 mol percent ethylene and correspondingly from about 60 to about 40 mol percent of chlorotrifluoroethylene, tetrafluoroethylene and mixtures thereof, are known in the art as disclosed, for example, in Mueller et al. U.S. Pat. No. 3,847,881, issued Nov. 12, 1974. As described therein, such copolymers may contain 3,3,3-trifluoro-2-trifluoromethyl propene to improve their stress-crack resistance. Also, as described in Carlson U.S. Pat. No. 3,624,250 issued Nov. 30, 1971, such copolymers may contain certain vinyl monomers in order to improve their stress-crack resistance. Such copolymers have been suggested as being useful for coating articles by powder coating techniques. However, it has been found that the adhesion between such copolymer coatings and the underlying substrate, particularly in the case of metal substrates, is too weak for certain applications, especially those wherein a severe environment is encountered. It would be desirable to provide a manner of improving the adhesion between a substrate and an overlying layer of such copolymers which has been coated thereon.

SUMMARY OF THE INVENTION

In accordance with one embodiment of the present invention, there are provided copolymers of ethylene, a halogenated comonomer selected from the group consisting of tetrafluoroethylene, chlorotrifluoroethylene and mixtures thereof and 0 to 10 mol percent of an additional monomer selected from the group consisting of 3,3,3-trifluoro-2-trifluoromethyl propene, a vinyl monomer which is free of telogenic activity and which provides a side chain having at least two carbon atoms, said side chain being aromatic or having its elements bonded together by a single bond only, or mixtures thereof, and containing from about 1 to about 40% by weight of an oxide of cobalt, nickel, manganese, chromium, tin, molybdenum, tungsten or mixtures thereof. Such compositions are particularly useful as a primer coating for substrates such as metals, preferably in conjunction with an overlying layer of such copolymers. In accordance with another embodiment of the present invention, coated articles are provided which comprise a substrate, a primer coating fused thereon and comprising a copolymer of ethylene, a halogenated comonomer selected from the group consisting of tetrafluoroethylene, chlorotrifluoroethylene and mixtures thereof and 0 to 10 mol percent of an additional monomer selected from the group consisting of 3,3,3-trifluoro-2-trifluoromethyl propene, a vinyl monomer which is free of telogenic activity and which provides a side chain having at least two carbon atoms, said side chain being aromatic or having its elements bonded together by a single bond only, or mixtures thereof, and from about 1 to about 40% by weight of an oxide of cobalt, nickel, manganese, chromium, tin, molybdenum, tungsten or mixtures thereof and an outer coating fused to the primer coating and comprising a copolymer of ethylene, a halogenated comonomer selected from the group consisting of tetrafluoroethylene, chlorotrifluoroethylene and mixtures thereof and 0 to 10 mol percent of an additional monomer selected from the group consisting of 3,3,3-trifluoro-2-trifluoromethyl propene, a vinyl monomer which is free of telogenic activity and which provides a side chain having at least two carbon atoms, said side chain being aromatic or having its elements bonded bonded together by a single bond only, or mixtures thereof. Preferably, the substrate is a metal substrate such as stainless steel or aluminum and the copolymers of the primer and overlying layers are the same.

DESCRIPTION OF THE PREFERRED EMBODIMENTS

As stated above, the copolymers of the present invention are known and may be prepared by known polymerization methods, such as are described in the aforesaid Mueller et al. and Carlson patents. The disclosure of both patents are specifically incorporated herein. Preferably, the copolymers contain from about 40 to about 60 mol percent of ethylene, from about 60 to about 40 mol percent of chlorotrifluoroethylene, tetrafluoroethylene or mixtures thereof and 0 to 10 mol percent of an additional monomer selected from the group consisting of 3,3,3-trifluoro-2-trifluoromethyl propene, a vinyl monomer which is free of telogenic activity and which provides a side chain having at least two carbon atoms, said side chain being aromatic or having its elements bonded together by a single bond only, or mixtures thereof. About equimolar copolymers of ethylene and chlorotrifluoroethylene or tetrafluoroethylene and containing about 0.1 to about 10 mol % of 3,3,3-trifluoro-2-trifluoromethyl propene are particularly preferred.

The termonomers disclosed in Mueller et al. (i.e., 3,3,3-trifluoro-2-trifluoromethyl propene) and in Carlson (i.e., vinyl monomers) may optionally be present in the copolymer. Amounts of about 0.1 to about 10 mol percent, based on the total mols of the other monomers, may be employed. Preferably, about 0.5 to about 5 mol percent of such additional monomers are employed.

The monomers disclosed in Carlson are copolymerizable vinyl monomers that are free of telogenic activity and which provide a side chain having at least two carbon atoms and being either aromatic or having its elements bonded together only by single bonds. By "free of telogenic activity" is meant that the vinyl monomer does not act as a chain transfer agent to an extent which undesirably limits the molecular weight of the copolymer. Examples of such vinyl monomers include fluorinated alpha-monoolefins and those of the following formulae:

$R-CF=CF_2$; $ROCF=CF_2$; $CF_3(CF_2)_mCH_2OCF=CF_2$; $CH_3(CH_2)_nOCF=CF_2$; $R'CH_2(X)=CH_2$ and $R^2OCH_2C(X)=CH_2$, wherein R is an organic group containing 2 to 8 carbon atoms, R' is a perfluorinated or chloro-fluoroalkyl group of 1 to 7 carbon atoms or a secondary or tertiary halo-alcohol group, $R^2$ is a perfluorinated or chlorofluoroalkyl of 1 to 7 carbon atoms, X is H or $CH_3$, m is an integer of 0 to 6 and n is an integer of 1 to 7. Especially preferred vinyl monomers are perfluoropropyl perfluorovinyl ether, 1,1,1-trifluoro-2-trifluoromethyl-4-penten-2-ol and and allyl heptafluoroisopropyl ether.

Preferred copolymers are those containing from about 40 to about 60 mol percent of ethylene and from about 60 to about 40 mol percent chlorotrifluoroethylene, especially about equimoler copolymers of such comonomers, as well as copolymers of ethylene and chlorotrifluoroethylene of the aforesaid mol content (and especially about an equmolar content) together with about 0.5 to 5 mol percent of 3,3,3-trifluoro-2-trifluoromethyl propene, and copolymers of ethylene and tetrafluoroethylene of the aforesaid mol content (and especially about an equimolar content) together with about 0.5 to 5 mol percent of perfluoropropyl perfluorovinyl ether.

The copolymer primer compositions include from about 1 to 40 weight percent preferably from about 5 to 35 weight percent and most preferably from about 15 to 25 weight percent, of an adhesion-promoting oxide of cobalt, nickel, manganese, chromium, tin, molybdenum, tungsten or mixtures thereof. The oxide may be added to the above-mentioned copolymers in ay suitable manner such as by dry blending, melt blending, blending in an extruder or the like. A homogeneous blend of the copolymer and the oxides is especially preferred.

Preferred oxides are those of cobalt, nickel, and manganese, with cobalt oxide being especially preferred. The cobalt oxide employed herein is preferably cobaltic oxide ($CO_2O_3$), although cobaltous oxide (CoO) and cobalto-cobaltic oxide ($Co_3O_4$) may also be used as well as mixtures of any two or more forms of cobalt oxide. The cobalt and other oxides are preferably employed in powder form.

It has been found that such compositions, especially compositions in which the copolymer is an approximate equimolar copolymer of ethylene and chlorotrifluoroethylene and containing 3,3,3-trifluoro-2-trifluoromethyl propene, are effective primer coatings for metal and other substrates. The incorporation of the aforementioned adhesion-promoting oxides in the primer composition provides coated aticles in which the outer coating is firmly adhered to the substrate.

Th copolymer compositions are preferably in a powder form and any of the well-known powder coating techniques may be employed to coat the compositions onto the substrate. These techniques include electrostatic deposition, fluidized bed and plasma or flame spray techniques. As these methods are conventional they are not specifically described herein. It is preferred to use an electrostatic deposition coating process. As is well known, this process provides initial adherence of a powder composition to a substrate and the substrate is thereafter subjected to a heat treatment above the melting point of the powder to fuse or coalesce ("flow out") the particles of the powder into a continuous layer. In forming the coated articles of this invention, it is preferred to employ flow out temperatures in the range of about 400° to 700° F., preferably about 500 to 550° F. for copolymers based on ethylene and chlorotrifluoroethylene and about 450° to 800° F., preferably about 575° F. for copolymers based on ethylene and tetrafluoroethylene or mixtures with chlorotrifluoroethylene. The duration of this heating step is dependent upon a number of factors, including the temperature employed, the coating thickness, the type of substrate, etc. In general, flow out times may conveniently be in the order of 1 or 2 minutes to 1 or 2 hours or more.

After a continuous primer coating is formed over the substrate, a layer of particles of the outer coating may be likewise deposited on the primer coating and then heated to flowout such particles into a continuous coating which is fused to the surface of the primer layer. The composition used to form the outer coating obviously need not include the adhesion-promoting oxide. Preferably, the copolymer used in the primer and outer coatings is the same. In certain cases, it may be desirable to omit the outer coating.

The primer composition and the outer copolymer composition may include any of the conventional additives usually incorporated into such copolymer compositions. Such additives include inert fillers, stabilizers, pigments, reinforcing agents, lubricants and the like. For example, the four component stabilizing system described in U.S. Pat. No. 3,773,698 to Khattab, issued Nov. 20, 1973, or the three component stabilizing system described in U.S. Pat. No. 3,745,145 to Khattab et al., issued July 10, 1973, for about equimolar ethylene-chlorotrifluoroethylene copolymer compositions may be employed herein.

The various substrates capable of being coated in accordance with this invention include, for example, a metal surface such as surfaces of steel, aluminum, iron, zinc, cadmium, magnesium, brass, Monel, Inconel; fabrics that will withstand the baking temperatures required, such as fiber glass fabrics, asbestos fabrics, metal fabrics and the like, as well as glass and any plastic surface which will withstand high temperatures required herein without degrading. Examples of such plastic surfaces include thermosetting resins, polyurethanes, silicones, fluoroelastomers and the like.

The type of metal or other material employed as the base layer is not critical and is dictated by the desired end use of the coated article. Especially preferred substrates are those formed of aluminum and stainless steel. Likewise, the thickness of the substrate is not critical and is dependent upon design factors.

It is preferred to pretreat metal substrates prior to coating with the primer layer to obtain a roughened surface in order to achieve a stronger adherence of the primer coating to the substrate. Any suitable surface treatment can be employed for this purpose such as sand or grit blasting, etching, etc.

The coating itself may be deposited upon the substrate in any desired thickness. In forming thick coatings (e.g. 1 mil or above) it may be desirable to employ a plurality of thin layers as is conventional in order to improve the uniformity and integrity of the coating. This of course requires additional exposure of the underlying coatings to high temperatures and for this reason it is preferred to include stabilizing agents in the coating compositions.

Substrates which are coated according to this invention have coated surfaces which are continuous and pinhole-free. The coatings may be employed as protective as well as antistick surfaces. Exemplary of articles which may be coated include wire and cable; cookware, industrial tubing, pipes, pumps and tanks, and drier rollers as well as other articles which require coatings having high strength at elevated temperatures, resistance to chemical attack, good electrical insulating properties, non-sticking surfaces, abrasion and scratch resistance and firm adherence of the coating. It has also been found that the compositions of this invention, especially those based on a copolymer of ethylene and tetrafluoroethylene, exhibit improved stress-crack resistance.

The coated articles of this invention preferably include the substrate, a layer of the primer composition of the thickness of about 0.5 to 20 mils, preferably about 1 to 3 mils, and an overlying layer of the copolymer composition having a thickness of about 0.5 to 500 mils, preferably about 3 to 20 mils.

Although it has been previously suggested in U.S. Pat. No. 2,979,418 to Dipner, issued Apr. 11, 1961, to incorporate a metal oxide, wherein the metal is above the fourth group of the periodic table, into a fluoropolymer compositions in order to provide a primer composition, the fluoropolymers therein described in each instance are copolymers of halogenated comonomers with other halogenated comonomers. The comonomers of the present invention are not disclosed nor taught in such patent. Furthermore, the primer compositions of the Dipner patent must be utilized in combination with another primer composition which is first applied to the substrate. Such primer cmposition includes a perfluorohaloolefin polymer and an adhesive resin such as an epoxy or phenolic resin. In contradistinction thereto, the primer compositions of the present invention can be directly applied to the substrate and provide excellent adhesion between the overlying layer and the substrate.

U.S. Pat. No. 3,019,206 to Robb, issued Jan. 30, 1962, suggests latex polyblends of polytetrafluoroethylene and fluorine-containing elastomers as useful coating materials. Among the heat stabilizers suggested for such blends is cobalt oxide. Although copolymers are also suggested, all of the copolymers are fluorinated or are perfluorohaloolefins. It is quite clear that this patent does not suggest the incorporation of cobalt or other oxide into a copolymer based on ethylene and tetrafluoroethylene, chlorotrifluoroethylene or mixtures thereof as an adhesion promoter to provide a primer coating composition.

In order to further describe the present invention, the following non-limited examples are given.

EXAMPLE 1

Four 8×8×¼ inch plaques of carbon steel which had been sandblasted with aluminum oxide were heated for 30 minutes to a temperature of 650° F. A powder copolymer composition of approximate equimolar portions of ethylene and chlorotrifluoroethylene and also containing about 2 mol percent of 3,3,3-trifluoromethyl propene was milled to about 50 micro average particle size. Four samples were prepared by dry blending the copolymer with various amounts of a cobalt oxide powder containing a mixture of cobaltic oxide and cobaltous oxide. Sample 1 contained no oxide, Sample 2 contained 2% by weight of the oxide, Sample 3 contained 10% by weight of the oxide and Sample 4 contained 20% by weight of the oxide.

Sample compositions 1–4 were coated onto the heated plaques by an elctrostatic spray to a thickness of about 12–15 mils and the plaques were allowed to flow out for 15 minutes at 550° F. Each coated plaque was exposed to 15 psig steam (250° F) for a total of 48 hours, with a 6 inch diameter circle of each plaque in contact with the steam.

After 2 hours of exposure, no evidence of coating lift-off were noticed on any plaque. However, after 8 hours of exposure numerous small bubbles were present on the control plaque (coated with Sample 1), indicating penetration of the steam and lift-off of the coating. No evidence of lift-off was noticed on the plaques coated with Samples 2–4.

After 24 hours, the bubbles observed at 8 hours on the control plaque were slightly larger. The plaque coated with Sample 2 had over its entire surface numerous bubbles of a size slightly larger than those of the control plaque, also indicating water vapor penetration and lift-off. The plaque coated with Sample 3 also had small bubbles on its surface but only in a band around the perimeter of the exposed area, indicating penetration and lift-off in the band area. The plaque coated with Sample 4 had very few small bubbles in one exposed area, indicating very little penetration of the coating by water vapor and possibility some lift-off.

After 48 hours, the control plaque had numerous bubbles, slightly larger than at 24 hours, over the entire exposed surface area. Simila results were observed for the plaque coated with Samples 2 and 3, with the bubbles on the plaque coated with Sample 1 being about twice the size observed at 24 hours. The plaque coated with Sample 4 also had bubbles about twice the size observed at 24 hours, but only over about one half of the exposed surface, indicating some lift-off.

The above demonstrates that the coating compositions containing 2% or more of the oxide evidenced superior bond strength over the control sample after 8 hours exposure to steam; that the samples containing 10% or more of the oxide were superior even after 24 hours of steam exposure and the sample containing 20% of the oxide was superior even after 48 hours exposure.

EXAMPLE 2

Twelve plaques were coated as in Example 1, 4 with the unfilled copolymer composition, 4 with a composition containing 2% by weight of the oxide and 4 with a composition containing 20% by weight of the oxide. Tabs were formed on each coated plaque by scoring the plaques with parallel lines along three sides extending towards the center and between each of the parallel lines adjacent each of the three sides. The plaques were exposed to 15 psig. steam as in Example 1, with the score lines, but not the tabs, extending into the exposed area. After exposure at 8 and 24 hour periods, the peel force required to pull the tabs from the plaques was measured three times in an Instron tester and averaged. The results are shown in Table I.

TABLE I

| Cobalt Oxide % | Exposure Time, Hours | Average Peel Force, lbs. |
|---|---|---|
| 0 | 0 | >50* |
| 2 | 0 | >61* |
| 20 | 0 | >18* |
| 0 | 8 | 7 |
| 2 | 8 | 6 |
| 20 | 8 | >20* |
| 0 | 24 | 3 |
| 2 | 24 | 2 |
| 20 | 24 | >21* |

*Indicates that tabs tore rather than peeled.

EXAMPLE 3

Following the procedure of Example 1, aluminum and stainless steel plaques were coated with a composition comprising an equimolar copolymer of ethylene and chlorotrifluoroethylene containing 5% by weight of manganese oxide. Whereas the coating on a control plaque coated with a composition not containing manganese oxide could easily be peeled from the metal with a knife, the coating of the composition containing the oxide could be peeled only with difficulty.

EXAMPLE 4

Example 3 was repeated except that the composition contained 5% by weight of nickel oxide. Similar results were obtained.

EXAMPLE 5

Example 3 is repeated with compositions containing, respectively, 5% by weight of tin oxide, molybdenum oxide, chromium oxide and tungsten oxide. Similar results are noted.

EXAMPLE 6

A mixture of 80% by weight of an approximate equimolar copolymer of ethylene and tetrafluoroethylene and 20% by weight of a mixture of cobaltic and cobaltous oxides was prepared and coated as described in Example 1 onto plaques of brass and of aluminum except that the preheat conditions were 650° F for 30 minutes and the flow out conditions were 575° F for 10 minutes. The coating thickness was about 10 mils. Powdered ethylenetetrafluoroethylene copolymer as a control composition was coated onto similar plaques in a similar manner. The adhesion of the control composition to the brass was poor and in a test where the coating was scored and lifted with a knife blade, the coating was very easy to lift. The composition containing the oxide had slightly better adhesion to the brass and was slightly more difficult to remove.

The adhesion of the control composition to the aluminum was poor and in the knife test, th coating was very easy to lift. The adhesion to the aluminum was substantially improved for the composition containing the oxide.

It was observed that the control coating on the brass and aluminum plaques stress-cracked a few minutes after removal from the flow out oven but that the oxide-containing coating on such plaques did not stress-crack.

EXAMPLE 7

Example 6 is repeated except that the copolymer included 3 mol percent of perfluoropropyl perfluorovinyl ether. Similar results are obtained.

It is to be understood that variations and modifications of the present invention may be made without departing from the scope of the invention. It is also to be understood that the scope of the invention is not to be interpreted as limited to the secific embodiment disclosed herein, but only in accordance with the appended claims when read in light of the foregoing disclosure.

What is claimed is:

1. An article of manufacture which comprises a substrate, a primer coating fused thereon and comprising a copolymer of about 40 to 60 mol percent of ethylene, about 60 to 40 mol percent of a halogenated comonomer selected from the group consisting of tetrafluoroethylene, chlorotrifluoroethylene and mixtures thereof and 0 to 10 mol percent of an additional monomer selected from the group consisting of 3,3,3-trifluoro-2-trifluoromethyl propene, a vinyl monomer which is free of telogenic activity and which provides a side chain having at least two carbon atoms, said side chain being aromatic or having its elements bonded together by a single bond only, or mixtures thereof, and containing from about 1 to about 40 percent by weight of an oxide of cobalt, nickel, manganese, chromium, tin, molybdenum, tungsten or mixtures thereof, and an outer coating fused to said primer coating and comprising a copolymer of about 40 to 60 mol percent ethylene, about 60 to 40 mol percent of a halogenated comonomer selected from the group consisting of tetrafluoroethylene, chlorotrifluoroethylene and mixtures thereof and 0 to 10 mol percent of an additional monomer selected from the group consisting of 3,3,3-trifluoro-2-trifluoromethyl propene, a vinyl monomer which is free of telogenic activity and which provides a side chain having at least two carbon atoms, said side chain being aromatic or having its elements bonded together by a single bond only, or mixtures thereof.

2. An article in accordance with claim 15 wherein said halogenated comonomer of said primer coating is chlorotrifluoroethylene.

3. An article in accordance with claim 2 wherein said copolymer of said primer coating comprises from about 0.1 to about 10 mol percent of 3,3,3-trifluoromethyl propene.

4. An article in accordance with claim 3 wherein said oxide is selected from the group consisting of cobalt oxide, nickel oxide and manganese oxide.

5. An article in accordance with claim 2 wherein said cobalt oxide is cobaltic oxide.

6. An article in accordance with claim 5 wherein said cobaltic oxide is present in said primer coating in an amount of about 15 to 25 percent by weight.

7. An article in accordance with claim 6 wherein said copolymer of said outer coating comprises from about 0.1 to about 10 mol percent of 3,3,3-trifluoro-2-trifluoromethyl propene.

8. An article in accordance with claim 7 wherein said substrate is a metal.

9. An article in accordance with claim 1 wherein said copolymers of said primer and outer coatings comprise about equimolar contents of ethylene and said halogenated comonomer.

10. An article in accordance with claim 9 wherein said oxide is nickel oxide.

11. An article in accordance with claim 9 wherein said oxide is manganese oxide.

12. An article in accordance with claim 1 wherein said halogenated comonomer of said primer coating is tetrafluoroethylene.

13. An article in accordance with claim 12 wherein said halogenated comonomer of said outer coating is tetrafluoroethylene.

14. An article in accordance with claim 12 wherein said oxide is cobalt oxide.

15. An article in accordance with claim 1 wherein said copolymer of said primer layer comprises from about 0.1 to about 10 mol percent of said vinyl monomer.

16. An article in accordance with claim 15 wherein said vinyl monomer is perfluoropropyl perfluorovinyl ether.

\* \* \* \* \*

UNITED STATES PATENT OFFICE
CERTIFICATE OF CORRECTION

Patent No. 3,989,873          Dated November 2, 1976

Inventor(s) Arthur B. Robertson, et al.

It is certified that error appears in the above-identified patent and that said Letters Patent are hereby corrected as shown below:

Column 2, line 67, "trifluoromethyl" should be --(trifluoromethyl)

Column 3, line 21 "ay" should be --any--.

Column 3, line 61 after "575°" insert --to 650°--.

Column 5, line 50 insert after "fluoro" -- -2-trifluoromethyl ---

Column 5, line 59 "elctrostatic" should be --electrostatic--.

Column 6, line 18 "Simila" should be --Similar--.

Column 7, line 35 "th" should be --the--.

Column 7, line 54 "secific' should be --specific--.

Column 8, line 22 "15" should be --1--

Column 8, line 26 insert after "3,3,3,-trifluoro" -- -2-trifluoromethyl propene --.

Signed and Sealed this

Thirteenth Day of September 1977

[SEAL]

Attest:

RUTH C. MASON         LUTRELLE F. PARKER
Attesting Officer       Acting Commissioner of Patents and Trademarks